United States Patent Office 2,746,953
Patented May 22, 1956

2,746,953

5-NITROTHIAZOLEAZOANILINE COMPOUNDS

Joseph B. Dickey and Edmund B. Towne, Kingsport, Tenn., assignors to Eastman Kodak Company, Rochester, N. Y., a corporation of New Jersey No Drawing. Application December 21, 1951,
Serial No. 262,902

10 Claims. (Cl. 260—158)

This invention relates to new azo compounds and their applications to the art of dyeing or coloring.

We have discovered that the azo compounds having the general formula:

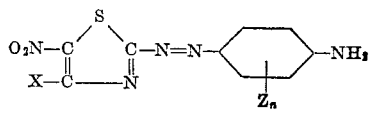

wherein X represents a hydrogen atom, an alkyl group having 1 to 6, inclusive, carbon atoms, a cyano group, a trifluoromethyl group or a

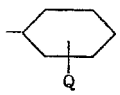

group, wherein Q represents a hydrogen atom, a nitro group, a chlorine atom, a bromine atom or an alkyl group having 1 to 4, inclusive, carbon atoms, Z represents an alkyl group having 1 to 4, inclusive, carbon atoms, an alkoxy group having 1 to 4, inclusive, carbon atoms, a chlorine atom, a bromine atom, a fluorine atom or a $$-\underset{\text{H}}{\text{N}}-\underset{\underset{\text{O}}{\parallel}}{\text{C}}-\text{Y}$$

group, wherein Y represents an alkyl group having 1 to 3, inclusive, carbon atoms and $n$ is selected from 0, 1 and 2, are valuable dyes for coloring textile materials made of or containing a cellulose alkyl carboxylic acid ester having two to four carbon atoms in the acid groups thereof. They are especially of use for the coloration of cellulose acetate textile materials. When applied to the aforesaid textile materials they give red, reddish-pink, reddish-violet, reddish-blue and blue dyeings.

The compounds of our invention also color wool, silk, nylon, polyethylene terephthalate, polyacrylonitrile and modified polyacrylonitrile textile materials similar colors to those just mentioned.

Since the azo compounds of our invention contain a free amino group they can be applied to the fabric undergoing coloration, diazotized thereon and coupled with known coupling components to give dark shades. This method of dyeing is known as "developed dyeing" and is carried out using known techniques. Suitable coupling components that can be employed include, for example, 2 - hydroxy - 3 - naphthoic acid, N - substitution products of aniline and substituted aniline compounds such as N - di - β - hydroxyethylaniline, N - di - (β - hydroxyethyl) - m - toluidine, N - di - (β - hydroxyethyl) - 2,5-dimethoxyaniline, N - di - (β - hydroxyethyl) - 2 - methyl-5 - methoxyaniline, the N - dimethyl -, N - diethyl-, N-ethyl - N - β - hydroxyethyl-, N - (di - β - hydroxyethyl)- and N - ethyl - N - β, γ - dihydroxypropyl derivatives of m-anisidine and m-phenetidine and p-cresol.

It is an object of our invention to provide new azo compounds. A further object is to provide new monoazo compounds having a free amino group which can be applied to a fabric, diazotized on the fabric and developed thereon to yield dark shades. Another object is to provide a satisfactory process for the preparation of our new azo compounds. A further object is to provide dyed textile materials, especially cellulose acetate textile materials, which have good fastness properties.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new azo compounds of our invention are prepared by diazotizing a 2-amino-5-nitrothiazole having the formula:

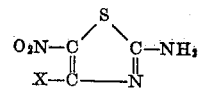

and coupling the diazonium compound obtained with a compound having the formula:

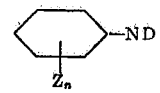

X, Z and $n$ in the foregoing formulas have the meaning previously assigned to them.

Typical of the 2 - amino - 5 - nitrothiazole compounds used in the preparation of the azo compounds of our invention are: 2 - amino - 5 - nitrothiapole, 2 - amino - 4-methyl - 5 - nitrothiazole, 2 - amino - 4 - ethyl - 5 - nitrothiazole, 2 - amino - 4 - n - butyl - 5 - nitrothiazole, 2-amino - 4 - n - hexyl - 5 - nitrothiazole, 2 - amino - 4-cyano - 5 - nitrothiazole, 2 - amino - 4 - trifluoromethyl-5 - nitrothiazole, 2 - amino - 4 - phenyl - 5 - nitrothiazole, 2 - amino - 4 - (o - nitrophenyl) - 5 - nitrothiazole, 2-amino - 4 - (m - nitrophenyl) - 5 - nitrothiazole, 2 - amino-4 - (p - nitrophenyl) - 5 - nitrothiazole, 2 - amino - 4 - (p-chlorophenyl) - 5 - nitrothiazole, 2 - amino - 4 - (o - bromophenyl) - 5 - nitrothiazole, 2 - amino - 4 - (o - fluorophenyl) - 5 - nitrothiazole, 2 - amino - 4 - (o - chlorophenyl) - 5 - nitrothiazole, 2 - amino - 4 - (p - fluorophenyl) - 5 - nitrothiazole, 2 - amino - 4 - (o - methylphenyl) - 5 - nitrothiazole, 2 - amino - 4 - (p - methylphenyl) - 5 - nitrothiazole and 2 - amino - 4 - (p - n-butylphenyl) - 5 - nitrothiazole. The use of 2 - amino-5 - nitrothiazole is ordinarily preferred.

The methyl, the ethyl, the n-propyl, the isopropyl, the n-butyl, the secondary butyl and the tertiary butyl groups are illustrative of the alkyl groups represented by Z and Q. Illustrative of alkoxy groups represented by Z are the methoxy, the ethoxy, the n-propoxy, the isopropoxy and the n-butoxy groups. The methyl, the ethyl, the n-propyl and the isopropyl groups are illustrative of the alkyl groups represented by Y.

The following examples illustrate the azo compounds of our invention and their manner of preparation:

EXAMPLE 1

*A. Preparation of nitrosyl sulfuric acid*

1.52 grams of sodium nitrite were added portionwise to 10 cc. of concentrated sulfuric acid, with stirring, and the temperature of the reaction mixture was allowed to rise to 65° C. The resulting solution was then cooled to 5° C. and 20 cc. of a mixture of 3 cc. of propionic acid and 17 cc. of acetic acid were added dropwise, with stirring, while allowing the temperature to rise to 15° C. and maintaining it at this temperature during the remainder of the addition.

B. Diazotiazation

The nitrosyl sulfuric acid mixture prepared as described above was cooled to 0° C.–5° C. and then 2.9 grams (0.02 mole) of 2-amino-5-nitrothiazole were added portionwise, while stirring, after which 20 cc. of a propionic-acetic acid mixture prepared as described above were added while keeping the temperature of the reaction mixture at 0° C.–5° C. The reaction mixture thus obtained was then stirred at about 0° C.–5° C. for three hours and excess sodium nitrite present in the mixture was destroyed by adding one to two grams of urea. A clear diazonium solution was obtained.

C. Coupling 12 cc. (0.005 mole) of the 2-amino-5-nitrothiazole diazonium solution prepared as described in B above were added, with stirring, at 0° C.–5° C. to a solution of 0.77 gram of 2,5-dimethoxyaniline in 10 cc. of a 1:6 mixture of propionic-acetic acid (i. e. 1 part by volume of propionic acid to 6 parts by volume of acetic acid). After a short time the reaction mixture was made neutral to Congo paper by adding sodium acetate portionwise and the coupling reaction was allowed to proceed for five hours at about 3° C. The reaction mixture was then poured into 250 cc. of cold water (15° C.) and after stirring a short time, it was filtered to recover the dye compound formed on the filter. The dye compound thus obtained was washed well with water and dried. 1.11 grams of the dye compound having the formula:

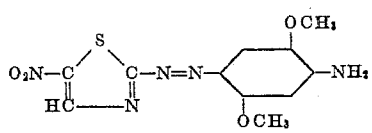

were obtained as a black powder. It has good affinity for cellulose acetate textile materials and colors said materials reddish-violet shades of good depth. The dyeings thus obtained have good fastness properties. The dye compound also colors wool, nylon, silk, polyethylene terephthalate, polyacrylonitrile and modified polyacrylonitrile textile fabrics.

As previously indicated, the dye compounds of the present invention can be diazotized on the fabric and then coupled with suitable coupling components to give dark shades. Thus, when the dye compound of the present example is diazotized on the fabric and then coupled with 2-hydroxy-3-naphthoic acid, deep black shades are obtained.

EXAMPLE 2

12 cc. of the 2-amino-5-nitrothiazole diazonium solution prepared as described in B of Example 1 were added, with stirring, at 3° C. to a solution of 0.97 gram of 2-ethoxy-5-acetaminoaniline in 10 ccs. of a 1:6 mixture of propionic-acetic acid. Upon working up the reaction mixture in accordance with the procedure described in Example 1, 1.03 grams of dye were obtained. It colors cellulose acetate textile materials reddish-violet shades. The properties of the dye are similar to the dye of Example 1.

EXAMPLE 3

8.5 grams of a 40 percent aqueous formaldehyde solution were added, with stirring, to a solution of 10.4 grams of sodium bisulfite in 20 cc. of water. The temperature of the reaction mixture rose to about 55° C. Then 10.7 grams of m-toluidine were added, with vigorous stirring, while maintaining the temperature of the reaction mixture below 75° C. The preparation of the N-(sodium sulfomethyl)-m-toluidine, the reaction product, is complete when all the m-toluidine has gone into solution.

The aqueous solution of N-(sodium sulfomethyl)-m-toluidine prepared as described above was cooled and diluted by adding about 1 liter of ice water. Then 12 cc. of a 2-amino-5-nitrothiazole diazonium solution prepared as described in Example 1 were added dropwise, with stirring, while maintaining the temperature of the reaction mixture at 3° C. (It is necessary to keep the reaction mixture and the diazonium solution that is being added at 0° C.–5° C. during the coupling operation. After the addition of the diazonium solution, the reaction mixture was stirred at about 0° C.–5° C. for 1½ hours, and then it was made neutral to Congo red paper by adding sodium carbonate portionwise. 5-Nitro-2-thiazoleazo-N-(sodium sulfomethyl)-m-toluidine having the formula:

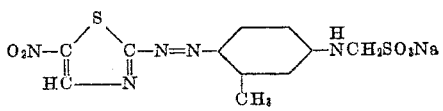

is formed.

The neutralized solution of 5-nitro-2-thiazoleazo-N-(sodium sulfomethyl)-m-toluidine formed as described above was treated at 3° C. with 10.8 grams of NaOH as a 25 percent aqueous solution and 9.4 cc. (0.14 mole) of concentrated aqueous ammonium hydroxide. The reaction mixture is then gradually warmed up to about 85° C. and kept at this temperature until a small sample of the dye (obtained by filtering the hot mixture and washing the residue with water) no longer gives a test for ionic sulfur. Generally one hour's heating at 85° C. is required to remove the sodium sulfomethyl group. Following the removal of the sodium sulfomethyl group, the reaction mixture was filtered and the product obtained on the filter was washed well with water and dried. 2.45 grams of 5-nitro-2-thiazoleazo-N-m-toluidine were obtained. It colors the aforesaid textile materials reddish-violet shades. When applied, for example, to cellulose acetate textile fabrics, the dye can be diazotized on the fabric and coupled with 2-hydroxy-3-naphthoic acid to give a black dyed fabric by the usual developed dye procedures.

EXAMPLE 4

1.7 grams of 2-amino-4-cyano-5-nitrothiazole were diazotized with nitrosyl sulfuric acid in an acetic-propionic acid mixture in accordance with the general procedure described in Example 1. The diazonium solution thus obtained was cooled to 3° C. and 1.5 grams of m-aminoacetanilide in 20 cc. of a 1:6 mixture of propionic-acetic acid were added dropwise, with stirring. After stirring at 3° C. for 15 minutes, the reaction mixture was made neutral to Congo paper by adding sodium acetate portionwise. The coupling reaction which takes place was then allowed to proceed for three hours, first at 0° C.–3° C., after which the temperature was allowed to rise to 20° C. The reaction mixture was then drowned in about 200 cc. of cold water (15° C.), filtered and the product obtained on the filter was washed well with water and dried. 2.0 grams of 5-nitro-4-cyano-2-thiazoleazo-m-aminoacetanilide which dyes cellulose acetate textile materials reddish-violet shades were obtained. The dye has the same general properties as the dye of Example 1.

EXAMPLE 5

1.59 grams of 2-amino-4-methyl-5-nitrothiazole were diazotized in a nitrosyl sulfuric acetic-propionic acid mixture in accordance with the general procedure described in Example 1. The diazonium solution thus prepared, cooled to 3° C., was added dropwise, with stirring, to an aqueous acetic acid solution of 2.09 grams of N-(sodium sulfomethyl)-aniline kept below 5° C. Upon completion of the coupling reaction, the reaction mixture was neutralized with sodium carbonate. The 5-nitro-4-methyl-2-thiazoleazo-N-(sodium sulfomethyl)aniline dye compound thus prepared was hydrolyzed with sodium hydroxide and ammonium hydroxide in accordance with the procedure described in Example 3. Upon working up the reaction mixture, 1.29 grams of 5-nitro-4-methyl-2-thiazoleazo-aniline were obtained. It colors the aforesaid textile materials reddish-violet shades.

EXAMPLE 6

2.13 grams of 2-amino-4-trifluoromethyl-5-nitrothiazole were diazotized and the diazonium compound obtained was coupled with 1.37 grams of 2-methoxy-5-methylaniline. Diazotization, coupling and recovery of the dye compound formed were carried out in accordance with the general procedure described in Example 1. 1.21 grams of 5-nitro-4-trifluoromethyl-2-thiazoleazo-2-methoxy-5-methylaniline which dyes cellulose acetate textile fabrics reddish-violet shades were obtained. The properties of the dye are generally similar to the dye of Example 1.

EXAMPLE 7

2.13 grams of 2-amino-4-trifluoromethyl-5-nitrothiazole were diazotized and the diazonium compound obtained was coupled with 2.39 grams of N-(sodium sulfomethyl)-m-anisidine. Diazotization, coupling, hydrolysis of the sodium sulfomethyl dye compound and recovery of the desired dye compound were carried out in accordance with the general procedure described in Example 3. 5-nitro-4-trifluoromethyl-2-thiazoleazo-m-anisidine which colors cellulose acetate textile fabrics reddish-violet shades was obtained. Upon diazotizing the dye on the cloth, followed by coupling with 2-hydroxy-3-naphthoic acid, black shades can be obtained.

EXAMPLE 8

1.70 grams of 2-amino-4-cyano-5-nitrothiazole were diaztotized and the diazonium compound obtained was coupled with 1.81 grams of 2,5-diethoxyaniline. Diazotization, coupling and recovery of the dye compound formed were carried out in accordance with the general procedure described in Example 4. 2.1 grams of 5-nitro-4-cyano-2-thiazoleazo-2,5-diethoxyaniline were obtained as a dark powder. It colors cellulose acetate textile materials reddish-violet shades. The properties of the dye of this example are similar to those of the dye of Example 1.

EXAMPLE 9

1.59 grams of 2-amino-4-methyl-5-nitrothiazole were diazotized and the diazonium compound obtained was coupled with 1.57 grams of 2-methoxy-5-chloroaniline. Diazotization, coupling and recovery of the dye compound formed were carried out in accordance with the general procedure described in Example 4. 1.6 grams of 5-nitro-4-methyl-2-thiazoleazo-2-methoxy-5-chloroaniline were obtained. It dyes cellulose acetate textile materials reddish-violet shades.

EXAMPLE 10

2.01 grams of 2-amino-4-n-butyl-5-nitrothiazole were diazotized and the diazonium compound obtained was coupled with 1.53 grams of 2,5-dimethoxyaniline. Diazotization, coupling and recovery of the dye compound formed were carried out in accordance with the general procedure described in Example 1. The dye compound thus obtained colors cellulose acetate textile materials blue shades.

EXAMPLE 11

2.29 grams of 2-amino-4-n-hexyl-5-nitrothiazole were diazotized and the diazonium compound obtained was coupled with 1.80 grams of 2-methoxy-5-acetaminoaniline. Diazotization, coupling and recovery of the dye compound formed were carried out in accordance with the general procedure described in Example 1. The dye compound obtained colors cellulose acetate textile materials blue shades.

EXAMPLE 12

2.21 grams of 2-amino-4-phenyl-5-nitrothiazole were diazotized and the diazonium compound obtained was coupled with 1.37 grams of 2-methoxy-5-methylaniline. Diazotization, coupling and recovery of the dye compound formed were carried out in accordance with the general procedure described in Example 1. The dye compound obtained colors cellulose acetate textile materials blue shades.

EXAMPLE 13

2.66 grams of 2-amino-4-(o-nitrophenyl)-5-nitrothiazole were diazotized and the diazonium compound obtained was coupled with 2.53 grams of N-(sodium sulfomethyl)-m-ethoxyaniline. Diazotization, coupling, hydrolysis of the N-(sodium sulfomethyl) azo compound and recovery of the desired dye compound were carried out in accordance with the general procedure described in Example 3. The dye compound thus obtained colors cellulose acetate textile materials reddish-blue shades.

EXAMPLE 14

2.55 grams of 2-amino-4-(p-chlorophenyl)-5-nitrothiazole were diazotized and the diaznoium compound obtained was coupled with 1.50 grams of m-acetanilide. Diazotization, coupling and recovery of the dye compound formed were carried out in accordance with the general procedure described in Example 4. The dye compound obtained colors cellulose acetate textile materials blue shades.

EXAMPLE 15

2.39 grams of 2-amino-4-(o-fluorophenyl)-5-nitrothiazole were diazotized and the diazonium compound obtained was coupled with 2.23 grams of N-(sodium sulfomethyl)-m-toluidine. Diazotization, coupling, hydrolysis of the N-(sodium sulfomethyl) azo compound and recovery of the desired dye compound were carried out in accordance with the procedure described in Example 3. The dye compound thus obtained colors cellulose acetate textile materials reddish-violet shades.

EXAMPLE 16

2.35 grams of 2-amino-4-(o-methylphenyl)-5-nitrothiazole were diazotized and the diazonium compound obtained was coupled with 1.57 grams of 2-methoxy-5-chloroaniline. Diazotization, coupling and recovery of the desired dye compound were carried out in accordance with the procedure described in Example 4. The dye compound thus obtained colors cellulose acetate textile materials reddish-violet shades.

EXAMPLE 17

2.77 grams of 2-amino-4-(p-n-butylphenyl)-5-nitrothiazole were diazotized and the diazonium compound obtained was coupled with 1.5 grams of m-aminoacetanilide. Diazotization, coupling and recovery of the dye compound formed were carried out in accordance with the procedure described in Example 4. The dye compound obtained colors cellulose acetate textile materials blue shades.

EXAMPLE 18

1.45 grams of 2-amino-5-nitrothiazole were diazotized and the diazonium compound obtained was coupled with 2.65 grams of N-(sodium sulfomethyl)-m-n-butylaniline. Diazotization, coupling, hydrolysis of the N-(sodium sulfomethyl) azo compound and recovery of the desired dye compound were carried out in accordance with the procedure described in Example 3. The dye compound thus obtained colors cellulose acetate textile materials reddish-violet shades.

By the use of 2.51 grams of N-(sodium sulfomethyl)-m-isopropylaniline in the above example, a dye compound is obtained which colors cellulose acetate textile materials reddish-violet shades.

EXAMPLE 19

1.45 grams of 2-amino-5-nitrothiazole were diazotized and the diazonium compound obtained was coupled with 2.67 grams of N-(sodium sulfomethyl)-m-n-propoxyaniline. Diazotization, coupling, hydrolysis of the N-(sodium sulfomethyl) azo compound and recovery of the desired dye compound were carried out in accordance with the procedure described in Example 3. The dye compound thus obtained colors cellulose acetate textile materials reddish-violet shades.

By the use of 2.81 grams of N-(sodium sulfomethyl)-m-n-butoxyaniline in the above example, a dye compound is obtained which colors cellulose acetate textile materials reddish-violet shades.

EXAMPLE 20

1.45 grams of 2-amino-5-nitrothiazole were diazotized and the diazonium compound obtained was coupled with 1.72 grams of m-bromoaniline. Diazotization, coupling and recovery of the dye compound formed were carried out in accordance with the general procedure described in Example 1. The dye compound thus obtained colors cellulose acetate textile materials reddish-pink shades.

EXAMPLE 21

1.45 grams of 2-amino-5-nitrothiazole were diazotized and the diazonium compound obtained was coupled with 1.11 grams of m-fluoroaniline. Diazotization, coupling and recovery of the dye compound formed were carried out in accordance with the general procedure described in Example 1. The dye compound thus obtained colors cellulose acetate textile materials reddish-pink shades.

EXAMPLE 22

1.45 grams of 2-amino-5-nitrothiazole were diazotized and the diazonium compound obtained was coupled with 1.64 grams of m-n-propionylaminoaniline. Diazotization, coupling and recovery of the dye compound formed were carried out in accordance with the general procedure described in Example 1. The dye compound thus obtained colors cellulose acetate textile materials reddish-blue shades.

By the use of 1.78 grams of m-n-butyrylaminoaniline in the above example, a dye compound is obtained which colors cellulose acetate textile materials reddish-blue shades.

The compounds tabulated hereinafter further illustrate the compounds of our invention. These compounds are prepared by diazotizing the diazo components named hereinafter and coupling the diazonium compounds obtained with the coupling components named hereinafter. The color given is that which the compounds color cellulose acetate. The diazotization, coupling, hydrolysis (where necessary) and recovery operations are carried out in accordance with the procedure described hereinbefore.

Table 1

[Diazo component: 2-amino-5-nitrothiazole.]

| | Coupling Component | Color |
|---|---|---|
| 1 | o-chloroaniline | reddish-pink. |
| 2 | m-chloroaniline | Do. |
| 3 | o-bromoaniline | Do. |
| 4 | m-bromoaniline | Do. |
| 5 | m-fluoroaniline | Do. |
| 6 | 2,5-di-β-hydroxyethoxyaniline | Blue. |
| 7 | 2-methyl-5-chloroaniline | reddish-violet. |
| 8 | 2-ethoxy-5-chloroaniline | Do. |
| 9 | 2-ethoxy-5-methoxyaniline | blue. |
| 10 | 2-methoxy-5-acetaminoaniline | Do. |
| | N-(sodium sulfomethyl) compound of: | |
| 11 | aniline | reddish-violet. |
| 12 | o-anisidine | Do. |
| 13 | m-anisidine | Do. |
| 14 | o-phenetidine | Do. |
| 15 | m-phenetidine | Do. |

Table 2

[Diazo component: 2-amino-4-methyl-5-nitrothiazole.]

| | Coupling Component | Color |
|---|---|---|
| 1 | o-chloroaniline | reddish-pink. |
| 2 | m-chloroaniline | Do. |
| 3 | o-bromoaniline | Do. |
| 4 | m-bromoaniline | Do. |
| 5 | m-fluoroaniline | Do. |
| 6 | 2,5-di-β-hydroxyethoxyaniline | blue. |
| 7 | 2-methyl-5-chloroaniline | reddish-violet. |
| 8 | 2-ethoxy-5-chloroaniline | Do. |
| 9 | 2-ethoxy-5-methoxyaniline | blue. |
| 10 | 2-methoxy-5-acetaminoaniline | Do. |
| | N-(sodium sulfomethyl) compound of: | |
| 11 | aniline | reddish-violet. |
| 12 | o-anisidine | Do. |
| 13 | m-anisidine | Do. |
| 14 | o-phenetidine | Do. |
| 15 | m-phenetidine | Do. |

Table 3

[Diazo component: 2-amino-4-cyano-5-nitrothiazole.]

| | Coupling Component | Color |
|---|---|---|
| 1 | o-chloroaniline | reddish-violet. |
| 2 | m-chloroaniline | Do. |
| 3 | o-bromoaniline | Do. |
| 4 | m-bromoaniline | Do. |
| 5 | m-fluoroaniline | Do. |
| 6 | 2,5-di-β-hydroxyethoxyaniline | blue. |
| 7 | 2-methyl-5-chloroaniline | reddish-blue. |
| 8 | 2-ethoxy-5-chloroaniline | Do. |
| 9 | 2-ethoxy-5-methoxyaniline | blue. |
| 10 | 2-methoxy-5-acetaminoaniline | Do. |
| | N-(sodium sulfomethyl) compound of: | |
| 11 | aniline | reddish-blue. |
| 12 | o-anisidine | Do. |
| 13 | m-anisidine | Do. |
| 14 | o-phenetidine | Do. |
| 15 | m-phenetidine | Do. |

Table 4

[Diazo component: 2-amino-4-trifluoromethyl-5-nitrothiazole.]

| | Coupling Component | Color |
|---|---|---|
| 1 | o-chloroaniline | reddish-violet. |
| 2 | m-chloroaniline | Do. |
| 3 | o-bromoaniline | Do. |
| 4 | m-bromoaniline | Do. |
| 5 | m-fluoroaniline | Do. |
| 6 | 2,5-di-β-hydroxyethoxyaniline | blue. |
| 7 | 2-methyl-5-chloroaniline | reddish-blue. |
| 8 | 2-ethoxy-5-chloroaniline | Do. |
| 9 | 2-ethoxy-5-methoxyaniline | blue. |
| 10 | 2-methoxy-5-acetaminoaniline | Do. |
| | N-(sodium sulfomethyl) compound of: | |
| 11 | aniline | reddish-blue. |
| 12 | o-anisidine | Do. |
| 13 | m-anisidine | Do. |
| 14 | o-phenetidine | Do. |
| 15 | m-phenetidine | Do. |

Table 5

[Diazo component: 2-amino-4-m-nitrophenyl-5-nitrothiazole.]

| | Coupling Component | Color |
|---|---|---|
| 1 | o-chloroaniline | reddish-violet. |
| 2 | m-chloroaniline | Do. |
| 3 | o-bromoaniline | Do. |
| 4 | m-bromoaniline | Do. |
| 5 | m-fluoroaniline | Do. |
| 6 | 2,5-di-β-hydroxyethoxyaniline | blue. |
| 7 | 2-methyl-5-chloroaniline | reddish-violet. |
| 8 | 2-ethoxy-5-chloroaniline | Do. |
| 9 | 2-ethoxy-5-methoxyaniline | blue. |
| 10 | 2-methoxy-5-acetaminoaniline | Do. |
| | N-(sodium sulfomethyl) compound of: | |
| 11 | aniline | reddish-violet. |
| 12 | o-anisidine | Do. |
| 13 | m-anisidine | Do. |
| 14 | o-phenetidine | Do. |
| 15 | m-phenetidine | Do. |

In the case of the coupling components numbered 11, 12, 13, 14 and 15, the N-(sodium sulfomethyl) azo compound formed by the coupling reaction is hydrolyzed to give the desired dye compound.

While in the foregoing examples and tabulations the colors yielded by our compounds have been illustrated more particularly in connection with the coloration of cellulose acetate textile materials as previously indicated, they also color wool, silk, nylon, polyethylene terephthalate, polyacrylonitrile and modified polyacrylonitrile textile materials similar colors.

In order that the preparation of the azo compounds of our invention may be entirely clear the preparation of certain intermediates used in their manufacture is described hereinafter.

2-amino-4-phenylthiazole 160 grams of bromine were added dropwise, with stirring, to a slurry of 120 grams of acetophenone and 152 grams of thiourea in a suitable reaction vessel. Heat was evolved and stirring became difficult.

The reaction mixture was heated on a steam bath overnight after which 2.5 liters of hot water (85° C.→) were added. The reaction mixture was stirred to effect solution and then filtered while hot. On cooling, the hydrobromide salt of 2-amino-4-phenylthiazole crystallized. Then concentrated ammonium hydroxide was added to the cold reaction mixture until it became slightly alkaline. The reaction mixture was filtered and the 2-amino-4-phenylthiazole collected on the filter was washed once with water and dried. A yield of 126 grams was thus obtained. Upon recrystallization from ethyl alcohol 2-amino-4-phenylthiazole melting at 144° C.–146° C. was obtained.

2-amino-4-(m-nitrophenyl)thiazole 160 grams of bromine were added dropwise, with stirring, to a mixture of 165 grams of m-nitroacetophenone and 152 grams of thiourea in a suitable reaction vessel. Toward the end of the bromine addition the reaction mixture became a slurry.

After heating on a steam bath overnight, the reaction product was dissolved by pouring the reaction mixture into 4 liters of hot water and the resulting solution was filtered while hot. Upon cooling, the hydrobromide salt of 2-amino-4-(m-nitrophenyl)thiazole crystallized. Then concentrated ammonium hydroxide was added to the cold reaction mixture until it became slightly alkaline. The reaction mixture was filtered and the 2-amino-4-(m-nitrophenyl)thiazole collected on the filter was washed once with water and dried. The yield of crude product was 87% of the theory. Upon recrystallization twice from ethyl alcohol 2-amino-4-(m-nitrophenyl)thiazole melting at 178° C.–180° C. was obtained.

2-amino-4-(m-nitrophenyl)-5-nitrothiazole 60 grams of 2-amino-4-(m-nitrophenyl)thiazole were dissolved at 15° C. in 300 cc. of H₂SO₄. 13.3 cc. of fuming nitric acid (90%, density 1.5, 5% excess) were added at 10° C.–15° C. and the reaction mixture was allowed to stand overnight. Then the reaction mixture was stirred into ice and the reaction product filtered off. The reaction product was slurried with sodium bicarbonate until neutral and then with water. Upon recrystallization from nitrobenzene the 2-amino-4-(m-nitrophenyl)-5-nitrothiazole reaction product melted at 236–237° C.

2-acetamido-4-phenylthiazole 15 grams of 2-amino-4-phenylthiazole were heated on a steam bath with 50 cc. of acetic anhydride. Solution first occurred and then the reaction product precipitated. The reaction mixture was cooled, poured into water and stirred until excess acetic anhydride had reacted. Then the reaction mixture was filtered and the 2-acetamido-4-phenylthiazole collected on the filter was dried. Upon recrystallization from ethyl alcohol it melted at 206° C.–208° C.

2-amino-4-phenyl-5-nitrothiazole

The 2-acetamido-4-phenylthiazole prepared as described above was nitrated in sulfuric acid with fuming nitric acid in accordance with the procedure described in connection with 2-amino-4-(m-nitrophenyl)-5-nitrothiazole. Upon recrystallization from an acetic acid-water mixture the 2-acetamido-4-phenyl-5-nitrothiazole reaction product melted at 215° C.–224° C. 7 grams of the acetamido reaction product were hydrolyzed to the amino compound using 45 cc. of HCl, 90 cc. of H₂O and 90 cc. of acetic acid. The 2-amino-4-phenyl-5-nitrothiazole thus obtained was recrystallized from nitrobenzene. The purified product sintered and darkened at 245° C. and decomposed at 260° C.

2-amino-4-trifluoromethylthiazole

This compound was prepared by reacting 14 grams (0.0955 mole) of 3-chloro-1,1,1-trifluoro-2-propanone and 7.26 grams of thiourea in 50 cc. of water for 4 hours on a steam bath. After making the reaction mixture slightly basic with sodium carbonate a yellow precipitate of 2-amino-4-trifluoromethylthiazole formed and was recovered by filtration and dried. It melted at 58° C.–60° C.

2-amino-4-trifluoromethyl-5-nitrothiazole

This compound is prepared by nitrating 2-amino-4-trifluoromethylthiazole at 5° C.–10° C. in sulfuric acid with fuming nitric acid and allowing the reaction mixture to warm to room temperature overnight. The reaction mixture is then drowned on ice, neutralized with sodium carbonate and the precipitated 2-amino-4-trifluoromethyl-5-nitrothiazole is filtered off, washed with water and dried.

2-amino-4-cyanothiazole

This compound is prepared by reacting equal molar quantities of thiourea and bromopyruvonitrile in ethyl alcohol.

2-amino-4-cyano-5-nitrothiazole

This compound is prepared by nitrating 2-amino-4-cyanothiazole at 5° C.–10° C. in sulfuric acid with fuming nitric acid and allowing the reaction mixture to warm to room temperature overnight. The reaction mixture is then drowned on ice, neutralized with sodium carbonate and the precipitated 2-amino-4-cyano-5-nitrothiazole is filtered off, washed with water and dried.

2-amino-4-methylthiazole

This compound melting at 44° C.–45° C. is obtained in a 70–75% yield by reacting thiourea and chloroacetone together in accordance with the procedure described by Byers and Dickey in Organic Syntheses, Collective Volume 2, page 31 (1943).

2-amino-4-alkylthiazole compounds having the general formula:

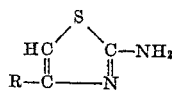

wherein R represents an alkyl group having 1 to 6, inclusive, carbon atoms are prepared by reacting thiourea with a ketone having the formula:

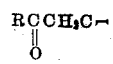

wherein R represents an alkyl group having 1 to 6, inclusive, carbon atoms. The reaction is carried out in accordance with the procedure used in preparing 2-amino-4-methylthiazole.

Compounds having the formula:

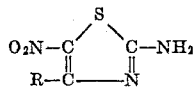

wherein R represents an alkyl group having 1 to 6, inclusive, carbon atoms are prepared by nitrating the corresponding unnitrated compound with fuming nitric acid in sulfuric acid at a temperature of about 5° C. The reaction is carried out using the general procedure described in connection with the preparation of 2-amino-4-trifluoromethyl-5-nitrothiazole.

2-amino-4-phenyl-5-nitrothiazole and 2-amino-4-(m-nitrophenyl)-5-nitrothiazole also can be prepared by the procedures referred to in chapter 8 of Organic Reactions, volume VI, published by John Wiley and Sons, Inc. (e. g. see pages 380 and 398). The procedures described or indicated herein are used in the preparation of the other 2-amino-4-substituted phenyl-5-nitrothiazole compounds referred to herein.

The azo dye compounds of our invention can be applied to the textile materials named hereinbefore in the form of an aqueous dispersion and are ordinarily so applied. To illustrate, the dye compound is finely ground with a dispersing agent such as sodium lignum sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

Widely varying amounts of dye can be used in the dyeing operation. The amount of dye used can be, for example, ⅓ to 3% (by weight) of that of the textile material although lesser or greater amounts of dye can be employed.

Azo compounds prepared from diazotized 2-amino-5-nitrothiazole compounds are disclosed and claimed in our copending application Serial No. 233,243, filed June 23, 1951, now U. S. Patent 2,659,719 issued November 17, 1953.

We claim:
1. The azo compounds having the general formula:

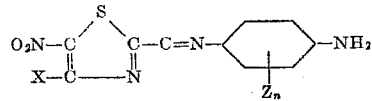

wherein X represents a member selected from the group consisting of a hydrogen atom, an alkyl group having 1 to 6, inclusive, carbon atoms, a cyano group, a trifluoromethyl group and a

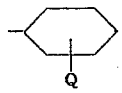

group, wherein Q represents a member selected from the group consisting of a hydrogen atom, a nitro group, a chlorine atom, a bromine atom and an alkyl group having 1 to 4, inclusive, carbon atoms, Z represents a member selected from the group consisting of an alkyl group having 1 to 4, inclusive, carbon atoms, an alkoxy group having 1 to 4, inclusive, carbon atoms, a chlorine atom, a bromine atom, a fluorine atom and a

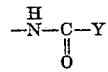

group, wherein Y represents an alkyl group having 1 to 3, inclusive, carbon atoms and $n$ is selected from 0, 1 and 2.

2. The azo compounds having the general formula:

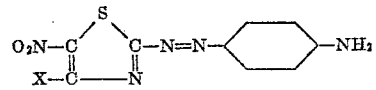

wherein X represents a member selected from the group consisting of a hydrogen atom, an alkyl group having 1 to 6, inclusive, carbon atoms, a cyano group, a trifluoromethyl group and a

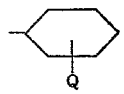

group, wherein Q represents a member selected from the group consisting of a hydrogen atom, a nitro group, a chlorine atom, a bromine atom and an alkyl group having 1 to 4, inclusive, carbon atoms.

3. The azo compounds having the general formula:

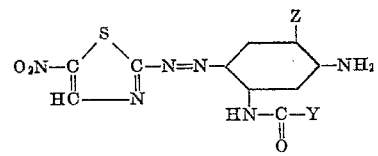

wherein Y represents an alkyl group having 1 to 3, inclusive, carbon atoms and Z represents an alkoxy group having 1 to 4, inclusive, carbon atoms.

4. The azo compounds having the general formula:

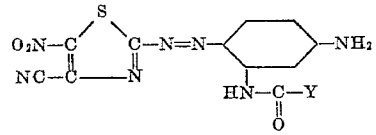

wherein Y represents an alkyl group having 1 to 3, inclusive, carbon atoms.

5. The azo compounds having the general formula:

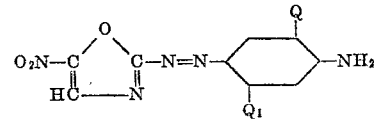

wherein Q and Q₁ each represents an alkoxy group having 1 to 4, inclusive, carbon atoms.

6. The azo compound having the formula:

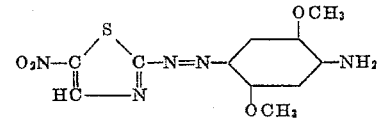

7. The azo compound having the formula:

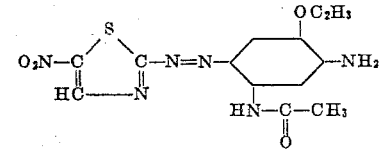

8. The azo compound having the formula:

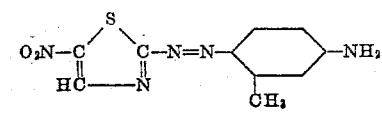

9. The azo compound having the formula:
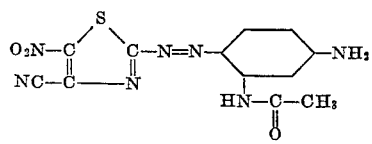
10. The azo compound having the formula:
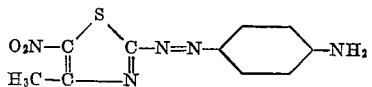
References Cited in the file of this patent
UNITED STATES PATENTS
2,551,056 Schetty _____ May 1, 1951
FOREIGN PATENTS
551,434 Great Britain _____ Feb. 22, 1943
587,134 Great Britain _____ Apr. 15, 1947
OTHER REFERENCES
Georgievics: "Dye Chemistry," 1920, pages 4 and 7.